United States Patent
Pawlak, III

(10) Patent No.: US 6,547,152 B1
(45) Date of Patent: Apr. 15, 2003

(54) VEHICLE HEATING VENTILATION AND AIR-CONDITIONING MODULE FOR IMPROVED HEATING AND DEFROSTING PERFORMANCE

(75) Inventor: John Lawrence Pawlak, III, Orchard Park, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/011,467

(22) Filed: Nov. 5, 2001

(51) Int. Cl.$^7$ .................................................. B60H 1/02

(52) U.S. Cl. .................. 237/12.3 B; 454/156; 454/160; 165/41

(58) Field of Search ................................. 454/156, 160, 454/161, 121, 261; 237/12.3 B; 165/41, 42

(56) References Cited

U.S. PATENT DOCUMENTS

| | | | | |
|---|---|---|---|---|
| 3,603,380 A | * | 9/1971 | Corhanidis | 165/42 |
| 4,702,307 A | * | 10/1987 | Ito et al. | 165/42 |
| 6,045,444 A | * | 4/2000 | Zima et al. | 454/121 |

\* cited by examiner

Primary Examiner—Derek Boles
(74) Attorney, Agent, or Firm—Patrick M. Griffin

(57) ABSTRACT

An air distribution module for a vehicle heating, ventilation and air-conditioning system receives a layered air-flow of an upper and lower layer for delivery to a vehicle interior. The air distribution module includes a housing defining a central plenum and an air inlet at an upstream side thereof for receiving the layered air-flow of first and second layers. At least a first arcuate duct is coupled to the housing and defines an inner passage wherein the arcuate duct further includes an inlet coupled to a downstream side of the housing and in fluidic communication with the plenum. The duct further includes an inversion loop for inverting the air-flow layers and an outlet for discharging the air into the vehicle interior.

22 Claims, 4 Drawing Sheets

VEHICLE HEATING VENTILATION AND AIR-CONDITIONING MODULE FOR IMPROVED HEATING AND DEFROSTING PERFORMANCE

TECHNICAL FIELD

The above-referenced invention relates to vehicle heating, ventilation and air-conditioning systems, and more specifically to an air distribution module for directing air-flow to different portions of the vehicle interior.

BACKGROUND OF THE INVENTION

Vehicle ventilation systems have long been utilized in vehicles to provide comfort to the vehicle occupants. Initial ventilation systems comprised a simple duct that was opened or closed by a manually operated valve directing outside ambient air to the vehicle interior. Through the years, consumers have desired increased interior comfort and manufacturers have delivered systems to satisfy consumer demand for improved interior temperature control. Advances made over the years include directing air through a heated core for delivering hot air to the vehicle interior and also for delivering hot air to the windshield to keep the windshield clear of frost and moisture. Subsequently, air conditioners have also become commonplace accessories in vehicles to provide cool air for the comfort of passengers in summer's heat.

Heating, ventilation, and air-conditioning systems in today's vehicles now provide total interior climate control. These new systems automatically maintain a desired temperature by delivering an appropriate mix of ambient, cooled, and heated air to the vehicle interior. More advanced systems also permit occupants to select a desired temperature for their individual zones and automatically maintain these zones at the pre-selected temperature. Such operation necessarily requires the automatic operation of the vehicle HVAC system wherein the ambient, cooled, and heated air are directed into an air distribution module to be ducted to the desired areas of the vehicle.

A prior art HVAC system is shown generally at 10 in FIG. 1. The vehicle HVAC system 10 is comprised of core module 12 and air distribution module 30. Ambient outside air or recirculated interior air is directed to air inlet 14 and is subsequently directed through air-conditioning evaporator 16 by the HVAC blower (not shown). After the air exits from evaporator 16 to pass between point 19 and wall 20, part of the air is directed through cool inlet area 22 and part of the air is directed to warm air passage 24. Inlet 22 and passage 24 are variable in area depending upon the position of air mix door 18. Air mix door 18 is hinged at 17 to pivot therearound and the position of air mix door 18 is directly related to the desired air temperature of air to be output to the interior of the vehicle. Thus, to obtain the maximum amount of cool air, air mix door 18 is rotated counterclockwise to maximize the area of cool air inlet 22. If heated air is desired, air mix door 18 is rotated clockwise to create a warm air passage 24 thereby diverting a portion of the air-flow exiting from evaporator 16 to flow through heater core 26 and duct the heated air through heated air inlet 28. An intermediate position of air mix door 18 facilitates a mixture of cool and hot air simultaneously entering air chamber 32 of air distribution module 30 to provide air at a desired temperature.

Air distribution module 30 typically has three designated outlets for delivering the conditioned air to different portions of the vehicle. These outlets are generally referred to as a defrost outlet 36 for delivering air to the interior surface of the windshield, vent outlet 40 for delivering air to the upper portion of the vehicle interior, and a heater outlet 44 for delivering air to the foot wells of the vehicle interior. Valves 34, 38, and 42 are selectively positionable in closed, opened, or intermediate positions to place the desired HVAC in the desired function. The HVAC system 10 is typically located in the center of the vehicle as are outlets 36, 40, and 44. Although there may be some mixing of the air upon entry to air distribution module 30, it is readily apparent that the cool or ambient air is directed to the upper portion of module 30 and the heated air is directed to the lower part of module 30 thereby creating a layered air-flow wherein the upper air layer is typically cooler than the bottom air layer.

Thus, the top-centered defrost outlet 36 is prone to discharging air that is substantially cooler than the air discharged through heater outlet 44 when air mix door 18 is in an intermediate position. Another disadvantage of the above-described HVAC system is that the bottom-center heater air outlet 44 is too low and rearward on the vehicle, and often requires complicated ducts to deliver the heated air to a desired location in the vehicle foot well. The top-center defrost air outlet 36 concentrates defroster air-flow at the center of the windshield which will in turn clear the center of the windshield before clearing the windshield area in the driver's and the passenger's line of sight. This undesirable situation is typically resolved by the incorporation of complex and relatively expensive ducting to provide a balanced defrost air-flow to the left and right windshield areas. Additionally, the top-center defrost air outlet 36 when opened tends to transmit undesirable HVAC blower noise directly to the occupants.

Thus, there is a need for an air distribution module for use in vehicle heating, ventilation, and air-conditioning systems that provides a more efficient air distribution within the vehicle without requiring additional complex ducting, and further delivers the correct air layer to the desired outlet.

SUMMARY OF THE INVENTION

In one aspect, the present invention includes an air distribution module for a vehicle heating, ventilation and air-conditioning system wherein the module receives a layered air-flow of an upper and a lower layer. The air distribution module includes a housing defining a central plenum and an air inlet at an upstream side thereof for receiving the layered air-flow of first and second layers. At least a first arcuate duct is coupled to the housing and defines an inner passage wherein the arcuate duct further includes an inlet coupled to a downstream side of the housing and in fluidic communication with the plenum. The duct further includes an inversion loop for inverting the air-flow layers and an outlet for discharging the air into the vehicle interior.

In another aspect of the present invention, an arcuate air duct for use in a vehicle heating, ventilation and air-conditioning system of the type that delivers layered air-flow to a distribution housing includes an inlet for coupling to a downstream side of the distribution housing and in fluidic communication with the housing for receiving a layered air-flow. The arcuate air duct further includes an inversion loop for inverting the air-flow layers and an outlet for delivering the air to the vehicle interior.

Yet another aspect of the present invention is a method of inverting and delivering a temperature layered air-flow from a vehicle heating, ventilation and air-conditioning system to the vehicle interior to selectively direct a desired temperature layer to a selected system outlet. The method includes the steps of providing a housing defining a plenum for receiving the layered air-flow at an upstream side; directing a first layer of cooler air to an upper portion of the housing plenum; and directing a second layer of warmer air to a lower portion of the housing plenum. Additional steps include affixing at least one arcuate duct in fluidic communication to a downstream side of the housing; providing an arcuate segment in the arcuate duct wherein the shape of the arcuate segment is such to invert the layers of the layered airflow; and finally directing the layered air-flow through the arcuate segment.

These and other features and advantages of the present invention will be further understood and appreciated by those skilled in the art by reference to the following specification, claims and appended drawings.

DESCRIPTION OF THE PREFERRED EMBODIMENT

Figure 1:
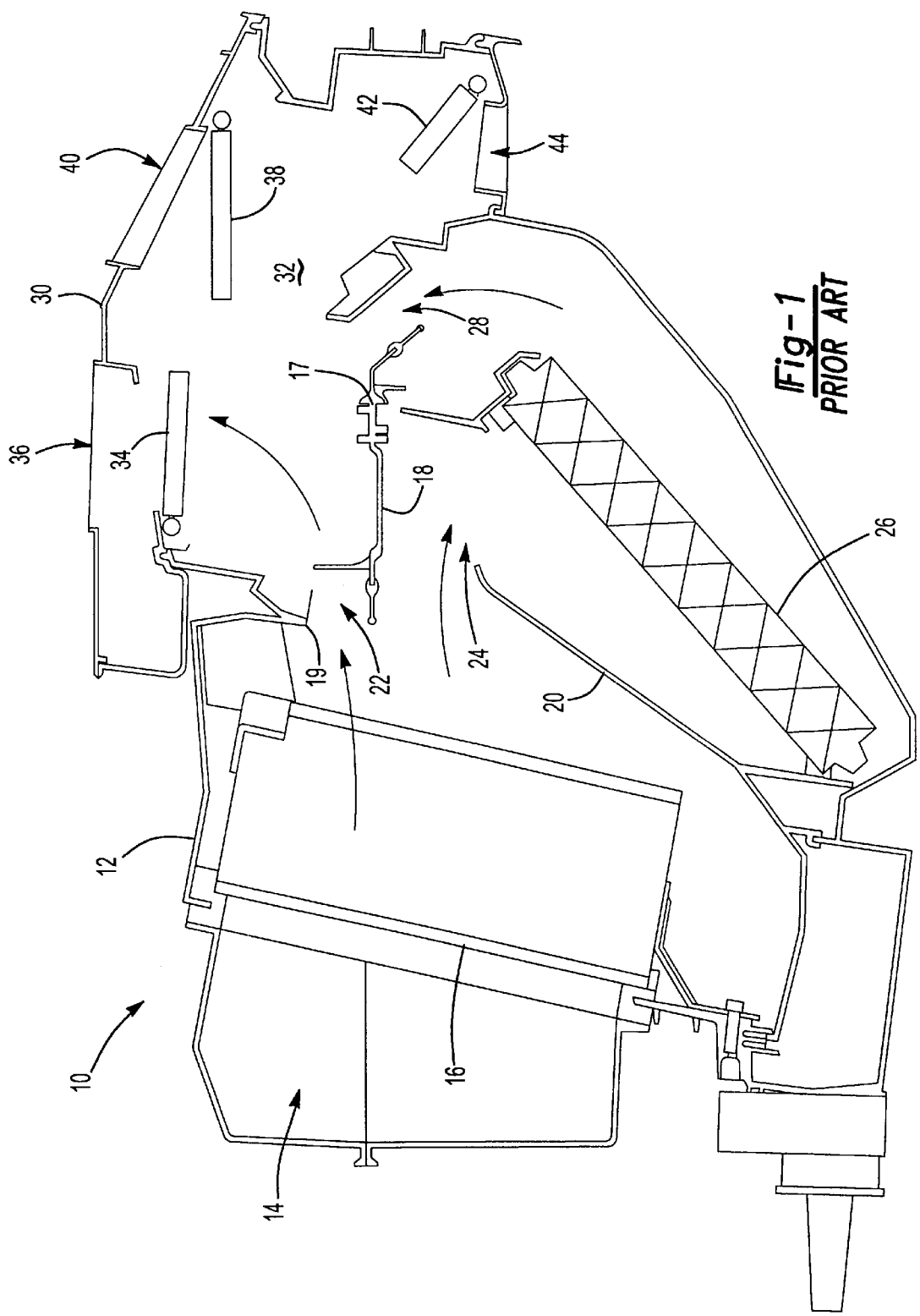
FIG. 1 is an elevational cross-section of a typical heating, ventilation and air-conditioning module illustrating the air-flow therethrough and the positioning of valves therein.

A heating, ventilation and air-conditioning system 50 (FIG. 2) embodying the present invention is adapted to direct a desired air-flow to defrost, ventilation and heater outlets in the vehicle interior. The HVAC system 50 includes a core module 52 which is substantially identical to core module 12 as described above and shown here schematically. Core module 52 includes an air conditioner evaporator 54 and a heater core 56 with an air mix door 58 therebetween to selectively divert the air-flow from evaporator 54 to air distribution module 60, heater core 56, or a selected combination thereof.

Referring now to FIGS. 2–5, an air distribution module 60 embodying the present invention is shown wherein air distribution module 60 comprises a housing 62 that is adapted at upstream side 61 to receive the layered air-flow from core module 52. Housing 62 defines a plenum 63 into which the layered air-flow is received by air distribution module 60. Housing 62 further defines a ventilation outlet 64 in the top of housing 62 and proximate to a downstream side 65 of module 60. A ventilation valve 66 is positioned at outlet 64 and can be selectively opened to capture at least a portion of the air-flow through module 60 and direct this air-flow through outlet 64, or closed to obstruct the air-flow from flowing through outlet 64.

Figure 2:
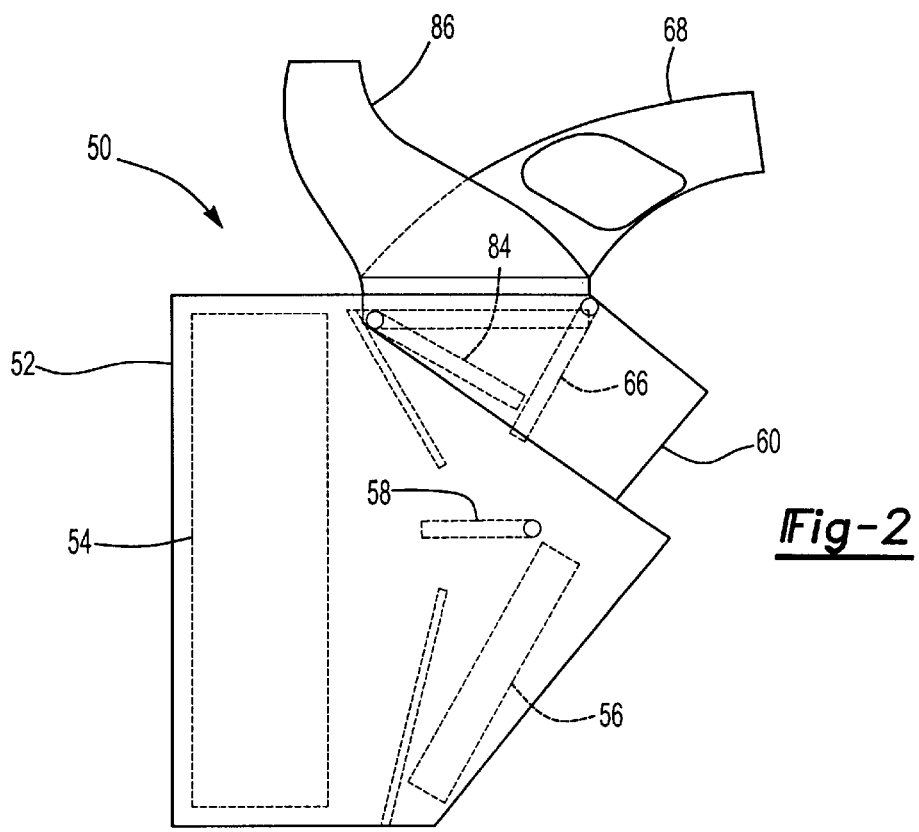
FIG. 2 is a schematic representation of a heating, ventilation and air-conditioning system including an air distribution module embodying the present invention.
Figure 3:
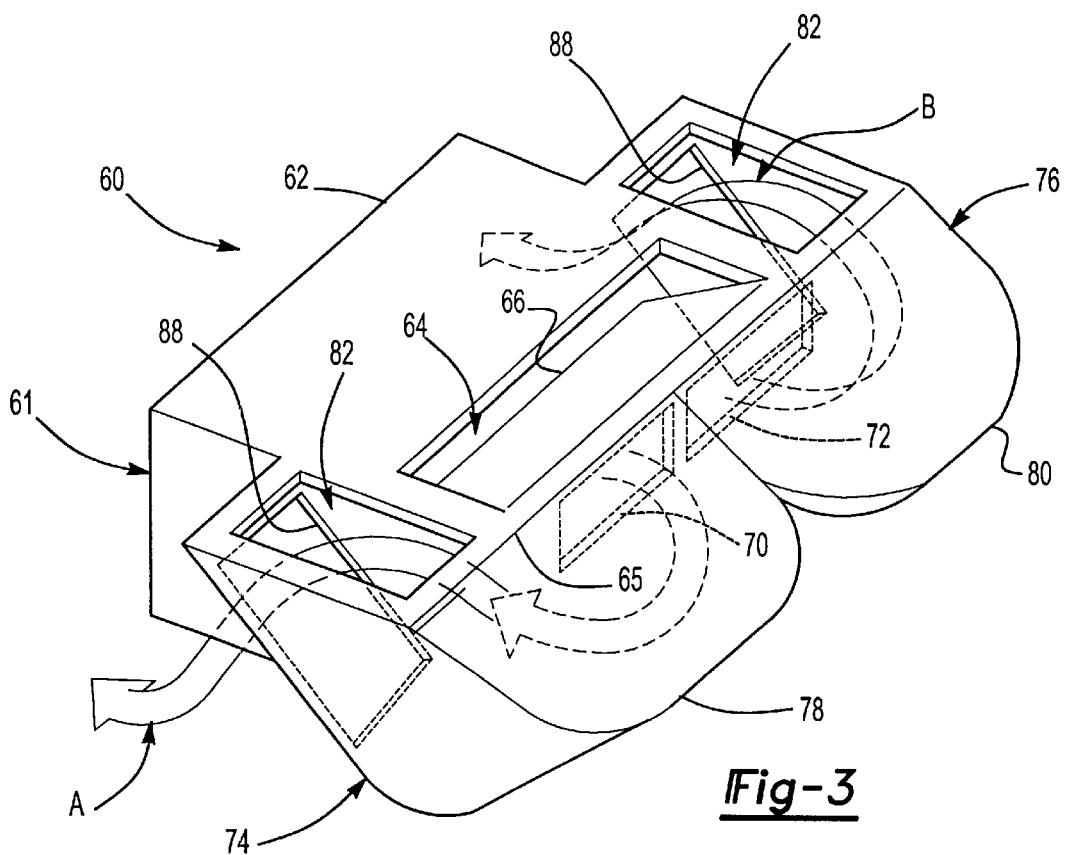
FIG. 3 is a perspective schematic representation of the air distribution module embodying the present invention.

As shown in FIG. 2, a ventilation duct 68 can be affixed over outlet 64 to direct the ventilation air to a selected area of the vehicle. Duct 68 has been removed from FIG. 3 for clarity. Housing 62 further defines first and second duct outlets 70 and 72 in downstream side 65 of module 60. First and second arcuate ducts 74 and 76 are affixed to housing 62 such that the inlet to ducts 74 and 76 are in fluidic communication and coincident with duct outlets 70 and 72. Arcuate ducts 74 and 76 each include an arcuate segment 78 and 80, respectively, and are shaped to reverse the direction of the air-flow therethrough and to direct the air-flow to the lateral sides of housing 62. Ducts 74 and 76 terminate at an outlet which, as shown in FIG. 3, includes an upper defrost outlet 82 and a lower heater outlet 88. Outlets 82 and 88 have valve 84 associated therewith as shown in FIG. 2 (not shown in FIG. 3 for clarity purposes). Arcuate ducts 74 and 76 can be formed separately from housing 62 and then attached thereto or, as is disclosed in FIGS. 2–4, arcuate ducts 74 and 76 can be integrally formed with housing 62 such as in a plastic molded process. Each of arcuate ducts 74 and 80 receive an air-flow from housing 62 and direct the air-flow to the respective lateral sides of housing 62 as shown by arrows A and B.

Figure 4:
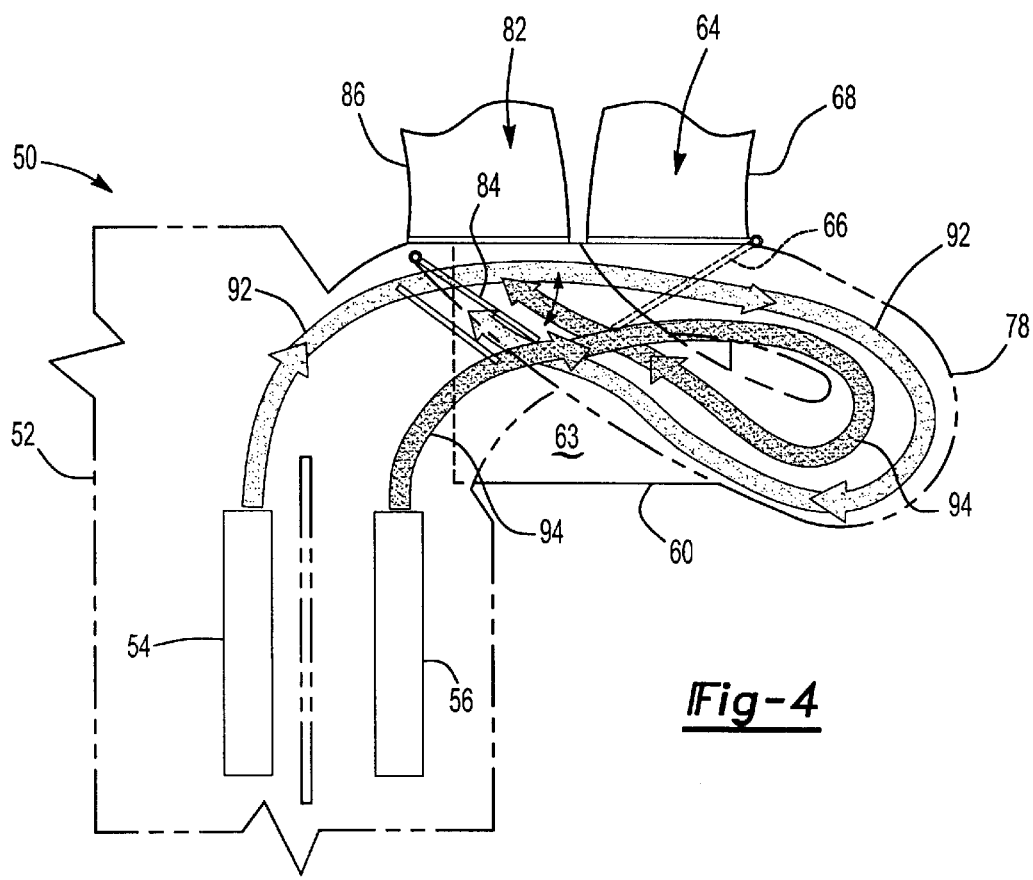
FIG. 4 is a schematic representation of the air-flow through a heating, ventilation and air-conditioning system including the air distribution module of FIG. 3.
Figure 5:
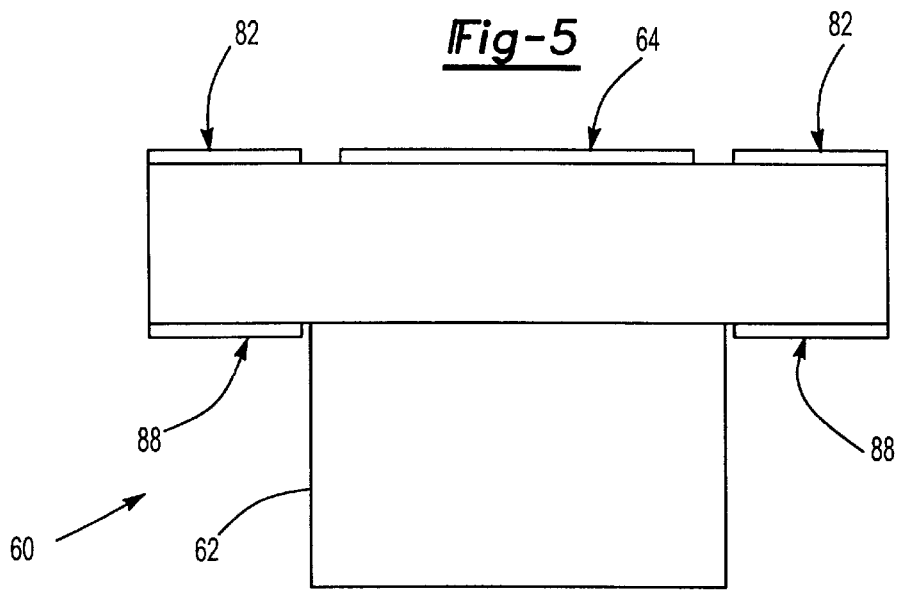
FIG. 5 is a rear elevational view of the HVAC system shown in FIG. 2.

Turning now to FIG. 4, a typical air-flow is shown traversing HVAC system 50. Generally, the upstream end 61 of housing 62 corresponds to the forward direction of the vehicle in which it is installed and downstream side 65 generally corresponds to the rearward direction of the vehicle interior. As shown, a cool air layer 92 from evaporator 54 is directed rearward to an upper portion of air distribution module 60 and a warm air layer 94 from heater core 56 is directed to a lower portion of air distribution module 60. Since ventilation air desired through ventilation duct 64 is most often desired to be cooler air, such as air-conditioned air in summer, ventilation valve 66 when opened extends into cool air stream 92 and diverts the rearward flowing air upwardly through ventilation duct 68 for distribution into the vehicle interior. However, as discussed earlier the cooler air of upper air-flow 92 is undesirable for directing through the defrost outlet. The defrost outlet is typically also located on an upper surface of the HVAC system distribution module for diversion to the windshield interior. Thus, it is most desirable to capture the warm air stream 94 to divert through the defrost outlet. This is accomplished by routing the layered air-flow through the arcuate segment 78 of arcuate duct 74 and in like manner through arcuate duct 76. As shown in FIG. 4, arcuate segment 78 in addition to diverting the air-flow A to the lateral sides of housing 62 also includes a vertically oriented arcuate aspect along arcuate segment 78 such that the air-flow layers 92 and 94 are inverted. In this manner, warm air layer 94 is now the uppermost layer and cooler air layer 92 is now the lowermost layer. Thus, as the inverted air-flow is directed to the arcuate duct 74 and outlets 82 and 88, heater/defrost valve 84 biases the airflow to either upper defrost outlet 82 or lower heater outlet 88 or a combination of both. In this manner heater/defrost valve 84 can be positioned to capture warm air layer 94 and direct layer 94 through defrost duct 86 to the vehicle windshield while concurrently capturing and diverting the cooler air layer 92 to the respective vehicle foot wells.

Those skilled in the art will readily understand that the specific shape of arcuate segments 78 and 80 are dependent upon the overall geometry of distribution module 60 and the desired positioning of defrost outlet 82 and heater outlet 88 with respect to module 60. The incorporation of arcuate ducts 74 and 76 advantageously redirects and inverts air-flows A and B from their rearward directional flow to a forward flow and to the defrost and heater outlets 82 and 88, respectively. Defrost outlet 82 and heater outlet 88 are more forwardly positioned in the vehicle and laterally separated.

Such forward and lateral positioning of defrost duct 82 and heater duct 88 results in a more efficient operation of the HVAC system. Those skilled in the art will also recognize that heater/defrost valve 84 can be configured to be either hinged at one end thereof or split into two centrally hinged valves to pivot therearound in openings 82 and 88. Dual centrally pivoted valve maintain the intent and function of diverting an upper layer through defrost outlet 82 and a lower air layer through heater outlet 88.

Figure 6:
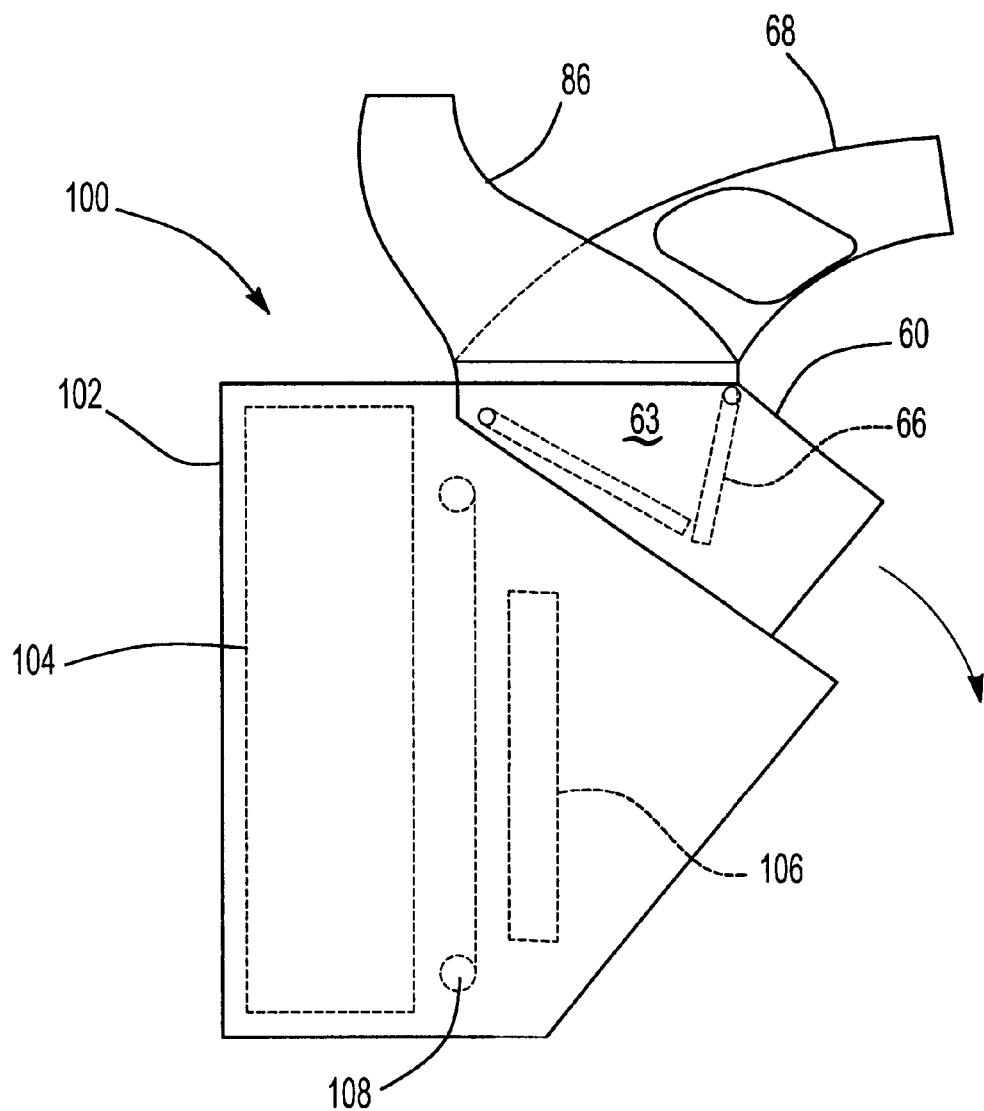
FIG. 6 is a side elevational view of an alternate heating, ventilation and air-conditioning system incorporating an alternate apparatus for diverting air to the heater core.

Turning now to FIG. 6, an alternate embodiment 100 of an HVAC system is shown in schematic form. HVAC system 100 comprises an air distribution module 60, which is identical to that described for HVAC system 50 above, and also includes core module 102. Core module 102 includes an air-conditioner evaporator 104 and a heater core 106. A film valve 108 is incorporated in place of a pivoting air mix door to divert all, a portion, or none of the air-flow across evaporator 104 to heater core 106 for heating. Film valves 108 are known in the art and thus the specific configuration is not discussed herein. Film valve 108 essentially operates in a single plane and thus eliminates the space requirements necessary for a pivoting door type air mix valve such as that shown as valve 18 in FIG. 1.

In the foregoing descriptions, those skilled in the art will readily appreciate that modifications may be made to the invention without departing from the concepts disclosed herein. Such modifications are to be considered as included in the following claims, unless these claims by their language expressly state otherwise.

I claim:

1. An air distribution module for a vehicle heating, ventilation, and air-conditioning system, wherein said module receives a layered air-flow of a first upper layer and a second lower layer, said module comprising:
   a housing defining a central plenum and an inlet at an upstream side thereof for receiving the layered air-flow of first and second layers; and
   at least a first arcuate duct coupled to said housing and defining an inner passage, said at least first arcuate duct including:
   an inlet coupled to a downstream side of said housing, said inlet in fluidic communication with said plenum for receiving the layered air-flow;
   at least one arcuate segment for inverting the layered air flow; and
   an outlet.

2. An air distribution module according to claim 1 wherein said inversion loop substantially defines a 180-degree arc.

3. An air distribution module according to claim 2 wherein said arc is substantially a vertical arc.

4. An air distribution module according to claim 3 wherein said outlet is positioned substantially proximate to a first lateral side of said housing.

5. An air distribution module according to claim 4 wherein said outlet comprises an upper outlet and a lower outlet, said upper outlet expelling the second air layer and said lower outlet expelling the first air layer.

6. An air distribution module according to claim 5 further including:
   an upper valve at said upper outlet, said upper valve selectively positionable to capture the second air layer and direct the second layer to said upper outlet; and
   a lower valve at said lower outlet, said lower valve selectively positionable to capture the first air layer and direct the first layer to said lower outlet.

7. An air distribution module according to claim 6 further including a second arcuate duct, said second arcuate duct having an outlet proximate to a second lateral side of said housing.

8. An air distribution module according to claim 5 further including a valve between said upper and said lower outlets, said valve selectively positionable to capture and direct at least a portion of the second air layer and direct the second air layer to said upper outlet, and simultaneously capture and direct at least a portion of the first air layer and direct the first air layer to the lower outlet.

9. An air distribution module according to claim 8 further including a second arcuate duct, said second arcuate duct having an outlet proximate to a second lateral side of said housing.

10. An air distribution module according to claim 1 wherein said housing includes a central ventilation duct.

11. An air distribution module according to claim 10 wherein said central ventilation duct further includes a central valve, said central valve positionable to selectively capture the first air layer or both layers of air.

12. An air distribution module according to claim 11 further including an inlet valve at an upstream side of said housing wherein said inlet valve defines first and second housing inlets, said first housing inlet for receiving therethrough the first air layer and said second housing inlet for receiving therethrough the second air layer.

13. An air distribution module according to claim 12 wherein said inlet valve is selectively repositionable to vary the size of said first and said second inlets.

14. An arcuate air duct for use in a vehicle heating, ventilation, and air-conditioning system of the type that delivers a temperature layered air-flow to a distribution housing, said arcuate air duct comprising:
   an inlet for coupling to a downstream side of the distribution housing, said inlet in fluidic communication with the housing for receiving the layered air-flow;
   at least one arcuate segment for inverting the air-flow layers; and
   an outlet.

15. An arcuate air duct according to claim 14 wherein said at least one arcuate segment substantially defines a 180-degree arc.

16. An arcuate air duct according to claim 15 wherein said outlet is positioned on a plane other than a plane of said inlet.

17. An arcuate air duct according to claim 16 wherein said arc is substantially a vertical arc.

18. An arcuate air duct according to claim 17 wherein said outlet comprises an upper outlet and a lower outlet, said upper outlet expelling the second air layer and said lower outlet expelling the first air layer.

19. An arcuate air duct according to claim 18 further including:
   an upper valve at said upper outlet, said upper valve selectively positionable to capture the second air layer and direct the second later to said upper outlet; and
   a lower valve at said lower outlet, said lower valve selectively positionable to capture the first air layer and direct the first layer to said lower outlet.

20. An air distribution module according to claim 18 further including a valve between said upper and said lower outlets, said valve selectively positionable to capture and direct at least a portion of the second air layer and direct the second air layer to said upper outlet, and simultaneously capture and direct at least a portion of the first air layer and direct the first air layer to the lower outlet.

21. A method of inverting and delivering a temperature layered air-flow from a vehicle heating, ventilation, and air-conditioning system to the vehicle interior to selectively direct a desired temperature layer to a selected system outlet, said method including the steps:

provide a housing defining a plenum for receiving the layered air-flow at an upstream side;

directing a first layer of cooler air to an upper portion of the housing plenum;

directing a second layer of warmer air to a lower portion of the housing plenum;

affixing at least one arcuate duct in fluidic communication to a downstream side of the housing;

providing an arcuate segment in the arcuate duct wherein the shape of the arcuate segment is such to invert the layers of the layered air-flow; and directing the layered air-flow through the arcuate segment.

22. The method according to claim 21 further including after the step of directing the layered air-flow through the arcuate segment the steps of:

providing an upper and a lower valve at an outlet of the arcuate duct;

selectively positioning the upper valve to capture the second air layer and direct the second air layer upwardly;

selectively positioning the lower valve to capture the first air layer and direct the first air layer downwardly.

* * * * *